F. D. BLAKE.
CAR STEP.
APPLICATION FILED FEB. 13, 1914.

1,122,063.

Patented Dec. 22, 1914.
2 SHEETS—SHEET 2.

Witnesses

Fred D. Blake
Inventor,
by C. A. Snow & Co.
Attorneys.

UNITED STATES PATENT OFFICE.

FRED D. BLAKE, OF CHARLOTTE, NORTH CAROLINA, ASSIGNOR TO BLAKE CAR STEP WORKS, OF CHARLOTTE, NORTH CAROLINA.

CAR-STEP.

1,122,063. Specification of Letters Patent. Patented Dec. 22, 1914.

Application filed February 13, 1914. Serial No. 818,519.

*To all whom it may concern:*

Be it known that I, FRED D. BLAKE, a citizen of the United States, residing at Charlotte, in the county of Mecklenburg and State of North Carolina, have invented a new and useful Car-Step, of which the following is a specification.

This invention relates to car steps of that type utilizing an extension step adapted to be retracted out of operative position while the car is in motion.

One of the objects of the present invention is to provide fixed steps, an extension step, and mechanism for operating the extension step, all of said steps and the operating mechanism being combined in a complete article adapted to be sold to car builders for application to cars under construction or which are being remodeled.

A further object is to provide a structure of this character which is simple and durable in construction and the operating mechanism of which is compact, and is fully concealed and protected by the stationary steps.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

Figure 1:
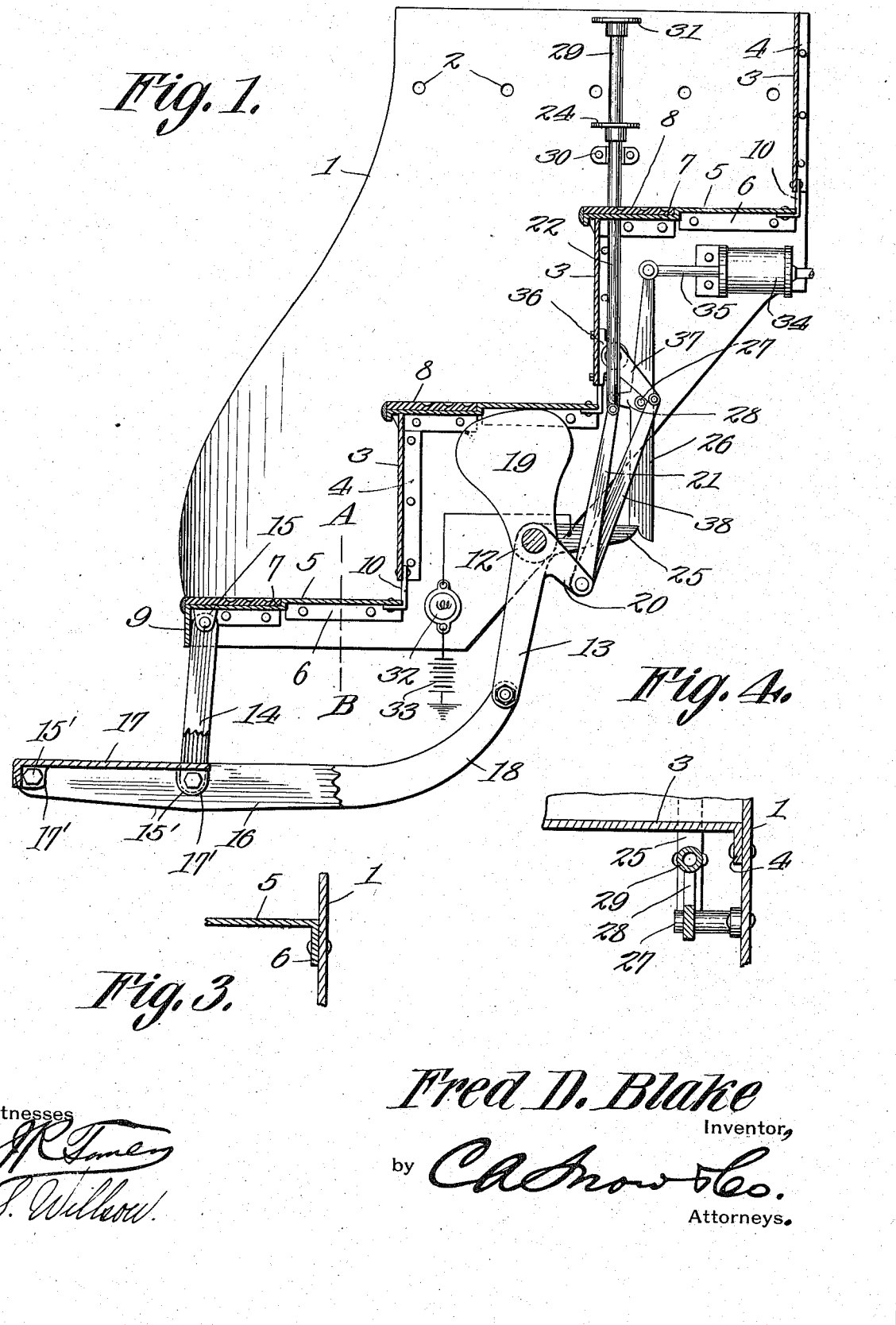
Figure 2:
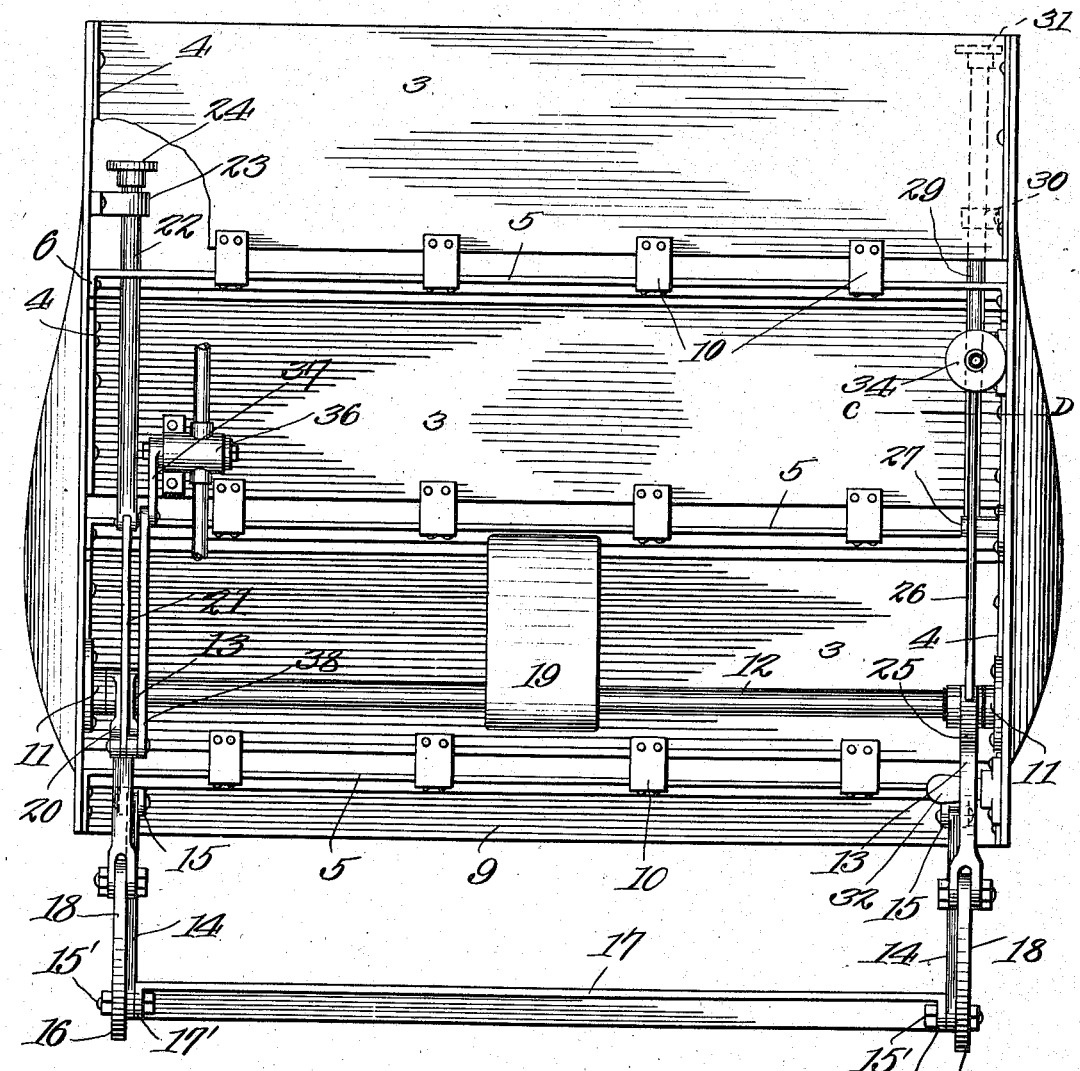
Figure 5:
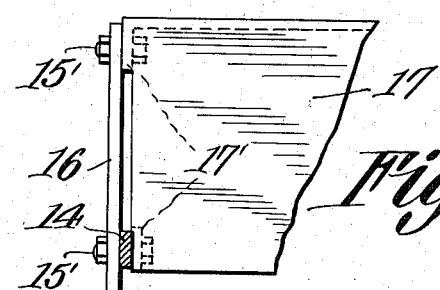

In said drawings:—Figure 1 is a vertical longitudinal section through the step and showing the operating mechanism partly in section and partly in elevation, the lamp circuit being shown in diagram. Fig. 2 is a rear elevation of the structure shown in Fig. 1, a portion being broken away. Fig. 3 is a section on line A—B Fig. 1. Fig. 4 is a section on line C—D Fig. 2. Fig. 5 is a plan view of a portion of the extension step.

Referring to the figures by characters of reference 1 designates sheet metal side plates of any preferred contour, the upper portions of these plates being formed with apertures 2 for the reception of rivets or the like whereby the side plates can be secured to the car structure. Interposed between the side plates 1 at proper intervals are risers 3, each being formed of a sheet metal plate having its ends provided with flanges 4 riveted or otherwise secured to the side plates. Interposed between the risers are tread plates 5 provided at their ends with flanges 6 riveted or otherwise secured to the side plates. Each tread plate has its forward portion depressed or offset as shown at 7 thus to form a seat for the reception of a strip 8 of rubber or any other suitable material whereby the danger of slipping is reduced. The lowermost tread plate 5 has a depending flange or apron 9 at its front edge, the same being of sufficient depth to conceal the extension step hereinafter referred to when the said step is moved to folded position. This lower tread plate 5 extends under but is spaced from the adjacent riser 3 and is connected to said riser by means of angular straps 10. The spaces provided between the tread plate and the riser permit water and dirt to pass therethrough. The other tread plates are all mounted upon the risers thereunder and extend under the risers thereabove, each tread plate being connected to the next adjoining riser thereabove by means of straps 10 similar to the straps 10 hereinbefore referred to.

From the foregoing description it will be seen that the stationary portion of the steps can be very cheaply but durably made and can be applied readily to a car structure in lieu of the ordinary cumbersome steps in use.

Bearings 11 are secured to the side plates 1 and journaled therein are the ends of a shaft 12 to which are secured bell crank levers 13. Links 14 are suspended from brackets 15 secured under the forward portion of the lower tread plate 5 and the lower ends of these links are engaged by bolts 15' to parallel arms 16. A tread plate 17 is secured to the arms 16, the bolts 15' being extended into ears 17' at the ends of the tread plate 17. Arms 16 extend inwardly and are curved upwardly as shown at 18, the inner end portions of the arms being pivotally connected to the depending parallel arms of levers 13. These arms and links 14 are preferably of the same length so that, when shaft 12 is rotated in one direction, the levers 13 and links 14 will operate to retract the tread plate 17 to position under and close to the bottom of the lower tread plate 5, the said tread plate 17 being housed between the lower end portions of the side plates 1 and back of the apron 9. A weight 19 is secured to the shaft 12 and is adapted normally to hold the tread plate 17 elevated out of active position.

One of the levers 13 has its upper arm 20 connected to a link 21. This link is pivotally attached to the lower end of a push rod 22 mounted in a guide bracket 23 secured to the back face of one of the risers 3. The push rod also extends through one of the tread plates 5 at a point close to one of the side plates 1 and a foot plate 24 is preferably arranged upon the upper end of the rod 22. The other lever 13 has its upper arm 25 extended from the shaft 12, this lever being insulated from said shaft. This arm 25 is adapted, when the extension step is lowered to active position, to move downwardly into engagement with the lower end of a latch lever 26 preferably fulcrumed at an intermediate point, as shown at 27 and provided with an arm 28 extending substantially at right angles therefrom. A push rod 29 is pivotally connected at its lower end to the arm 28 and is slidably mounted within one of the tread plates 5 and within a guide bracket 30. A foot plate 31 is preferably provided at the upper end of the push rod 29.

An electric lamp 32 is mounted back of the lower tread plate 5 so that the light therefrom will be thrown onto the tread plate 17 when said plate is moved to extended or active position. This lamp is preferably electrically connected to the arm 25 and is grounded to the car. Thus it will be seen that when the step is extended and the arm 25 is in contact with the latch lever 26, a circuit will be formed from the source of electricity, indicated diagrammatically at 33, through the car structure to latch lever 26, thence to arm 25 and thence to the lamp. When it is desired to shift the extension step to inactive position, the push rod 29 is depressed, thus actuating the latch lever 26 so as to shift it out of engagement with the arm 25. The circuit to the lamp 32 will be promptly broken and, at the same time, the weight 19 will be released and will swing downwardly and forwardly, thus causing shaft 12 to rotate and causing the arms 13 to pull rearwardly and upwardly upon the members 16. Consequently, the tread plate 17 will be elevated to position close to and under the lower tread plate 5 and back of the apron 9. When it is desired to move the extension step to active position, the foot plate 24 is depressed. This will cause the link 21 to push against arm 20 and will rotate shaft 12 so as to elevate the weight 19 to the position shown in Fig. 1 and cause the arms 13 to push against the members 16, thus shifting the extension step downwardly and outwardly to the position shown in Fig. 1. At the same time arm 25 will be brought into engagement with the lower end of the latch lever 26, thus fastening the extension step in its lowered position and at the same time completing a circuit through the lamp 32.

If desired the mechanism of the extension step can be controlled by air under pressure in connection with the step operating system disclosed in Patent No. 1,089,106, issued to me on March 3, 1914.

In the system referred to, air under pressure is admitted to a cylinder which operates the latch lever for the purpose of releasing the extension step and a valve is utilized for controlling the flow of air within the system, this valve being actuated by the extension step when moving to active or inactive position. In the present case a cylinder corresponding to that in the system referred to has been illustrated at 34, the piston rod 35 being connected to the upper end of lever 26. Furthermore a valve 36 corresponding with the valve in the system referred to has an arm 37 connected by a link 38, to the arm 20. Thus it will be seen that air under pressure can be utilized for the purpose of operating the mechanism herein described.

The means employed for illuminating the extension step when in active position constitutes the subject matter of a divisional application filed by me.

What is claimed is:—

1. The combination with a fixed car step, of a revoluble shaft, arms movable therewith, links depending from the step, members connected at intermediate points to the links and at their inner ends to the arms, a step tread bearing downwardly at its ends upon and secured to the said members, said links being located adjacent the back edge of the tread and said members being extended from the front to the rear edge of the tread, and means for rotating the shaft to move the tread into and out of position under and close to the fixed step.

2. The combination with a fixed car step, and an apron depending from the front edge thereof, of links depending from the front portion of the fixed step and back of the apron, a revoluble shaft, arms extending from the shaft, members supported at intermediate points by the links and at their inner ends by the arms, a step tread mounted at its ends upon the said members, which members extend from the front to the back edges of the tread, means for rotating the shaft to lower and project the tread and move the links against the depending apron, said apron constituting means for limiting the movement of said links in one direction, means for holding the shaft against rotation when the tread is lowered and extended, means for releasing the shaft, and means for automatically actuating the shaft when released to elevate said tread to position close to and under the stationary step and back of the apron.

3. The combination with side plates, of a tread plate secured at its ends thereto and having a depending apron at its front edge, an extension step, a link connection for suspending the step below said tread plate, said apron and link connection coöperating to limit the movement of the extension step in one direction, and means for housing the extension step back of the apron and close to the tread plate.

4. The combination with side plates, of riser plates interposed therebetween and secured thereto, tread plates mounted adjacent their outer edges upon the riser plates next thereunder and extending under but spaced from the riser plates next thereabove, spaced means for connecting the riser plates to the tread plates thereunder, an extension step suspended below the lower tread plate, and means for shifting said extension step into and out of position under said lower tread plate.

5. A step attachment for a car structure, including side plates adapted to be secured to a car structure, riser plates interposed therebetween and having end flanges secured thereto, tread plates mounted adjacent their outer edges upon the riser plates next thereunder and extending under but spaced from the riser plate next thereabove, each of said tread plates having end flanges secured to the side plates, a lower tread plate, connections between the tread plates and the riser plate thereabove, there being spaces between said connections, and an extension step suspended below the lower tread plate and shiftable into and out of position thereunder.

6. The combination with side plates, of riser plates interposed therebetween and secured thereto, tread plates mounted adjacent their outer edges upon the riser plates next thereunder and extending under but spaced from the riser plates next thereabove, spaced means for connecting the riser plates to the tread plates thereunder, a lower tread plate having a depending apron, an extension step suspended below the lower tread plate, and means for housing the extension step back of the apron.

7. The combination with side plates, of riser plates interposed therebetween and secured thereto, tread plates mounted adjacent their outer edges upon the riser plates next thereunder and extending under but spaced from the riser plates next thereabove, spaced means for connecting the riser plates to the tread plates thereunder, a lower tread plate having a depending apron, each of said tread plates having a depression in the front portion thereof, antislipping means seated within the depression, an extension step suspended below the lower tread plate, means for locking the extension step in projected position, means for releasing the extension step, and means for automatically shifting the extension step, when released, to position under the lower tread plate and back of the apron.

8. The combination with a fixed car step, of links depending from the front portion of the fixed step, a revoluble shaft, arms extending from the shaft, members supported at intermediate points by the links and at their inner ends by the arms, a step tread mounted at its ends upon the said members, means for rotating the shaft to lower and project the tread, means for holding the shaft against rotation when the tread is lowered and extended, means for releasing the shaft, and means for automatically actuating the shaft when released to elevate said tread to position close to and under the stationary step and back of the apron.

9. The combination with a fixed car step, of a revoluble shaft, arms movable therewith, links depending from the step, members connected at intermediate points to the links and at their inner ends to the arms, a step tread bearing downwardly at its ends upon and secured to the said members, said links being located adjacent the back edge of the tread, and means for rotating the shaft to move the tread into and out of position under and close to the fixed step.

In testimony that I claim the foregoing as my own, I have hereto affixed my signature in the presence of two witnesses.

FRED D. BLAKE.

Witnesses:
 SELINA WILLSON,
 I. E. SIMPSON.